(No Model.)
O. R. TOWER.
CAN FOR MEASURING AND RETAILING MILK.
No. 368,257. Patented Aug. 16, 1887.
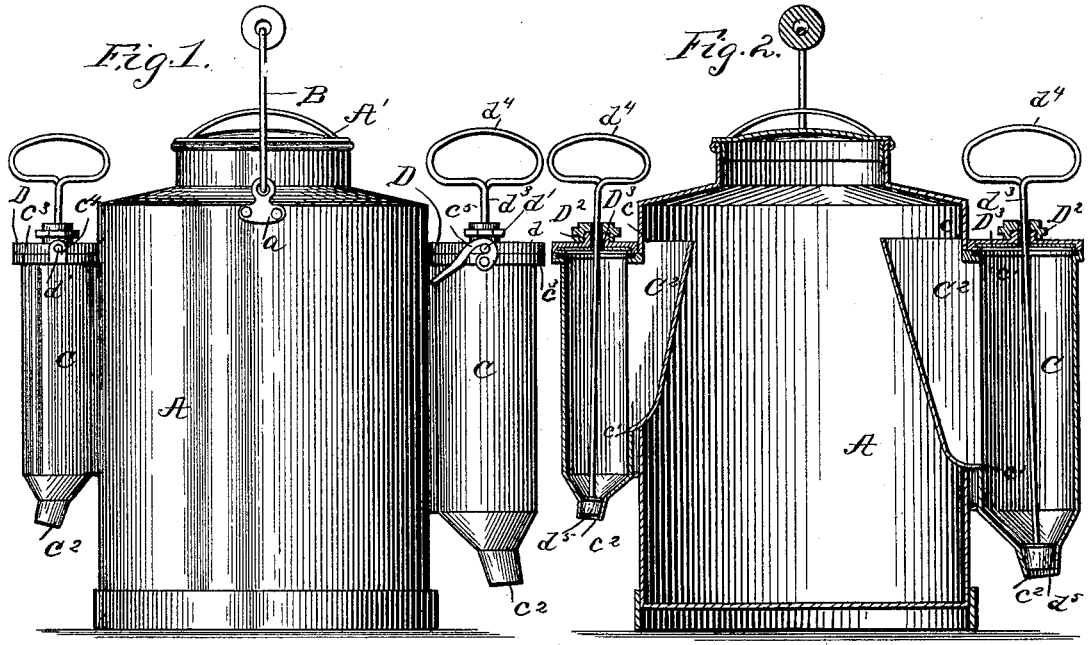
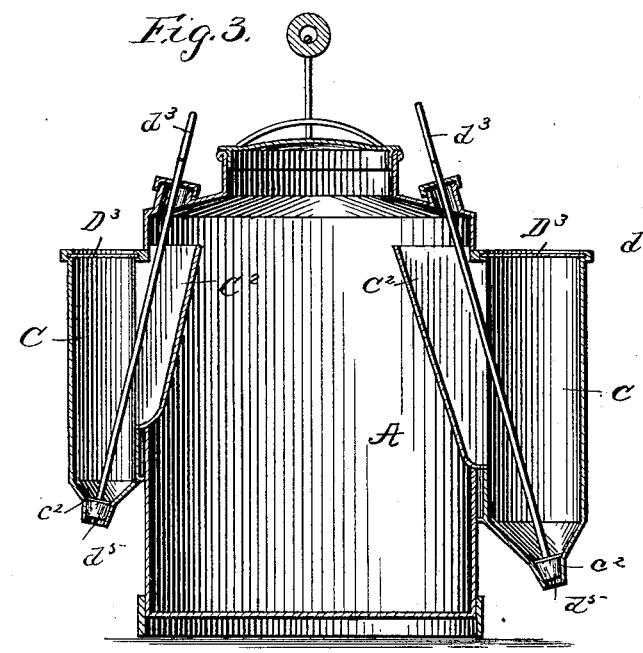
Witnesses
Wm R Rheem
C. S. Heyer
Inventor
Orville R. Tower
By his Attorneys,
C. A. Snowlea

UNITED STATES PATENT OFFICE.

ORVILLE RODNEY TOWER, OF LA CROSSE, WISCONSIN.

CAN FOR MEASURING AND RETAILING MILK.

SPECIFICATION forming part of Letters Patent No. 368,257, dated August 16, 1887.

Application filed April 6, 1887. Serial No. 233,917. (No model.)

*To all whom it may concern:*

Be it known that I, ORVILLE RODNEY TOWER, a citizen of the United States, residing at La Crosse, in the county of La Crosse and State of Wisconsin, have invented a new and useful Improvement in Milk-Cans, of which the following is a specification.

My invention relates to improvements in milk-cans; and it consists in the construction and combination therewith of measuring devices, which will be more fully hereinafter described, and pointed out in the claims.

One object of my invention is to provide a portable and convenient milk-can having measuring-vessels of varying capacities combined therewith, which are filled from the can and the contents thereof released from the measuring attachments without loss of the same or the disturbance of the remaining contents of the can.

A further object of my invention is to provide a portable milk-can having measuring attachments combined therewith, the construction and operation of which are simple and effective, strong and durable, convenient and accessible, easily handled and readily understood, positive in its desired ultimate result, readily applied with milk-cans now in use, and comparatively inexpensive in its manufacture.

I attain these objects by the construction illustrated in the accompanying drawings, wherein like letters of reference indicate similar parts in the several views, and in which—

Figure 1 is a side elevation of my improved milk-can with its measuring attachments. Fig. 2 is a longitudinal vertical section through the can and measuring attachments. Fig. 3 is a similar view of a modified construction. Fig. 4 is a top plan view of the transparent cover for attachments.

A indicates the ordinary form of milk-can, having ears $a$ $a$ attached to the top thereof, to which a bail, B, is connected, and is also provided with a cap or cover, A'. On each side of the can A two measuring attachments, C C, are secured by soldering. These attachments are constructed in the form of hollow cylinders, having the capacity for measuring a pint and quart, respectively. Openings $c$ $c$ are formed in the sides of the can A at the point where the two attachments C and C are secured, and corresponding apertures, $c'$ $c'$, are formed in the sides of the said attachments, which are adapted to register with the openings $c$ $c$ in the sides of the can. These two sets of openings $c$ and $c'$ are united by metallic spouts $C^2$ $C^2$, which are constructed in the form of a nose extending upward and outward from the lower portions of the said apertures or openings toward the top of the can, and are open at their top portions and, as shown, extend some distance above the openings and the tops of the cylinders to prevent slopping over.

The cylinders C and C, forming the measuring attachments, are provided with funnel-shaped bottoms having openings or short spouts $c^2$ $c^2$ secured to the lower portions to one side of their centers and arranged on a slight outward incline, so that the milk flowing therefrom may be more readily directed into a containing-vessel, and slopping thereof prevented. The upper portions of these cylinders C and C are provided with stiff metallic rings $c^3$ $c^3$, which have apertured ears $c^4$ $c^4$ formed in one side thereof, and suitable recessed clamping-levers, $c^5$ $c^5$, pivoted thereto diametrically opposite to the said apertured ears $c^4$ $c^4$.

On the top portion of the cylinders C and C covers or caps D D are adapted to be removably secured, for the purpose of readily cleaning the measuring attachments. These covers D D are constructed in the form of metallic rings $d$ $d$, having studs or pins $d'$ $d'$ formed integral therewith and projecting outwardly from the sides thereof diametrically opposite to each other, said covers also being provided with top cross-braces, $d^2$ $d^2$, passing centrally thereover and secured at each side thereof. Mounted in the central portion of each of the braces $d^2$ are stuffing-boxes $D^2$ $D^2$, through which valve-stems $d^3$ pass and operate. The upper end of each of these valve-stems $d^3$ has a loop, $d^4$, formed therewith, and the lower ends of said stems have a cork plunger, $d^5$, suitably secured thereto. The plungers $d^5$ are adapted to engage with the openings or short spouts $c^2$ $c^2$ or be drawn therefrom by means of the loops $d^4$, and thereby close or open the said spouts $c^2$ $c^2$, as may be desired. The covers D D are further provided with glass plates D³ D³, which are secured in the rings d d and by means of which the contents of the interior of the measuring-vessels can be readily inspected and the height of the liquid therein ascertained, and also as a convenient means for accurately replacing the plungers d⁵ in the spouts c² c². Before placing the caps D D on their respective cylinders C C rubber gaskets or packings are interposed between the top of the said cylinders and caps. The caps are then placed on the cylinders with one of the pins d' in each engaging with the aperture in the ears c⁴ c⁴. The other pins d' are then engaged by the recessed clamping-levers c⁵ c⁵ and the caps are thus secured in connection with the cylinders D D.

As shown in Fig. 3, the stuffing-boxes are placed on the top portion of the can and the rods or plungers extended up therethrough, the remaining construction being similar to that heretofore described.

In the operation of my improved milk-can measuring attachment the can is tilted to one side, so that the fluid will run into one or the other of the inclined metallic spouts C² C², as the pint or quart measure is required to be used, and the fluid running into either one or the other of the cylinders fills the same, and when the required amount has been obtained therein the can is then returned to its normal vertical position. The plunger d⁵ is then steadily drawn up out of engagement with its spout c² and the milk that has been thus measured allowed to flow uninterrupted into a containing-vessel.

The convenience and utility of my improvement are evident, and its compactness and portability render it of great usefulness in the transportation of milk and the rapid measured distribution thereof.

It is obvious that many minor changes in the construction and arrangement of the parts of the same could be made and substituted for those shown and described without in the least departing from the nature and principle of my invention.

Having thus described my invention, I claim—

1. In combined milk-can and measuring attachments, the combination of the can proper, measuring-cylinders of different capacities attached to each side thereof and communicating by openings therewith and having funnel-shaped bottoms, and means, as set forth, for operating the several parts, substantially as described.

2. In a combined milk-can and measuring attachment, the combination of the can proper, measuring-cylinders of different capacities attached thereto on each side thereof and communicating by openings therewith and having funnel-shaped bottoms slightly inclined to the vertical plane of said cylinders for the purpose of directing the flow therefrom, transparent covers for said cylinders, and means, as set forth, for operating the several parts, substantially as described.

3. In a combined milk-can and measuring attachment, the combination of the can proper, measuring-cylinders of different capacities attached thereto and communicating by openings therewith and provided with funnel-shaped bottoms, suitable transparent covers for said cylinders, and piston-rods passing thereinto having stuffing-boxes arranged at their upper portions and plungers on their lower ends engaging with the funnel-shaped bottoms, substantially as described.

4. In a combined milk-can and measuring attachment, the combination of the can proper, measuring-cylinders of different capacities attached thereto and communicating by openings therewith and having funnel-shaped bottoms, transparent covers removably secured by recessed clamps and pins upon said covers, metallic spouts arranged over the communicating openings on the interior of the can proper and extending slightly above the top of the cylinders, and a piston and cork plunger mounted and operating as set forth, substantially as described.

5. In a combined milk can and measuring attachment, the combination, with the can proper, of measuring-cylinders connected to each side thereof and communicating therewith and transparent covers removably secured to said cylinders, as and for the purposes specified.

6. In a combined milk-can and measuring attachment, the combination, with the can proper, of measuring-cylinders connected thereto and communicating therewith, transparent covers adapted to be removably secured to said cylinders, and spouts inclined outward and extending up to the top of the can a short distance above the tops of the cylinders, arranged over the communicating openings between the can and the said cylinders, substantially as described.

In testimony that I claim the foregoing as my own I have hereto affixed my signature in presence of two witnesses.

ORVILLE RODNEY TOWER.

Witnesses:
J. L. PETTINGILL,
GEO. W. BRICE.